Dec. 15, 1925.
G. D. RITCHIE
CHEESE CUTTER
Filed July 7, 1925
1,565,816
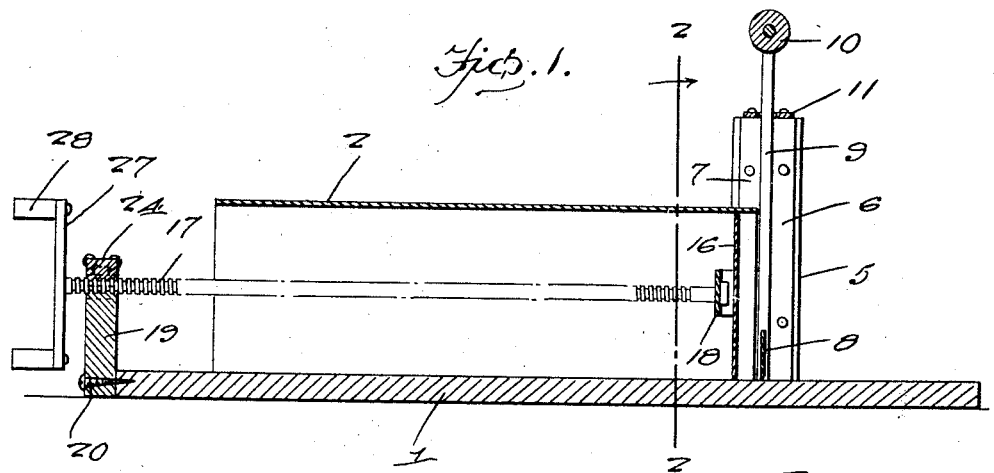
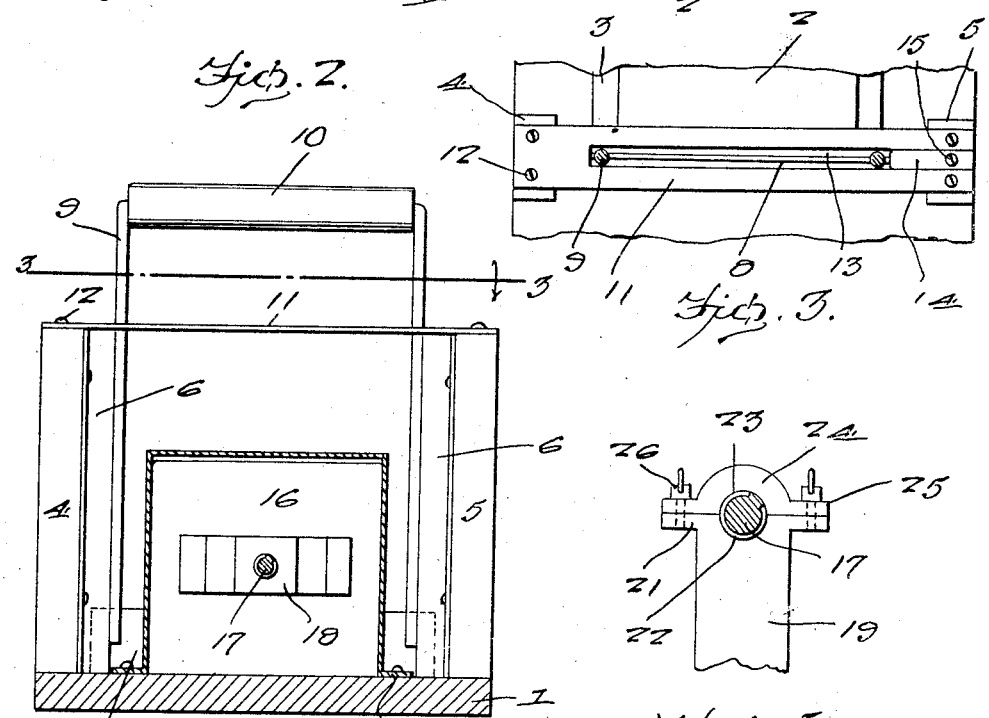
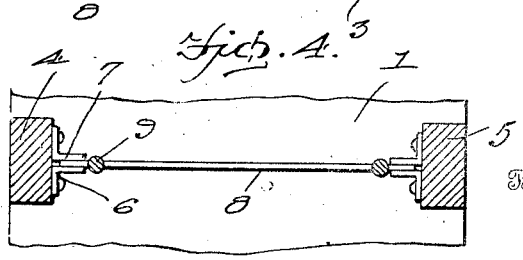
Inventor
G. D. Ritchie
By Clarence A. O'Brien
Attorney Patented Dec. 15, 1925.

1,565,816

UNITED STATES PATENT OFFICE.

GEORGE DEWEY RITCHIE, OF MADISON, WEST VIRGINIA.

CHEESE CUTTER.

Application filed July 7, 1925. Serial No. 41,983.

*To all whom it may concern:*

Be it known that I, GEORGE DEWEY RITCHIE, a citizen of the United States, residing at Madison, in the county of Boone and State of West Virginia, have invented certain new and useful Improvements in a Cheese Cutter, of which the following is a specification.

This invention relates to improvements in cheese cutters and has for its principal object to provide a device which is particularly adapted to be used in cutting blocks of cheese which are not put up in rectangular shape into slices.

One of the important objects of the present invention is to provide a cheese cutter of a vertically reciprocating knife which is slidably supported between a pair of spaced uprights, the latter being secured on a suitable base, additional means being provided for feeding the cheese to the cutter whereby considerable time and labor will be saved in cutting or slicing a block of cheese.

A further object is to provide a cheese cutter of the above mentioned character wherein a casing of substantially the same shape as the block of cheese is arranged on the support for receiving the block of cheese, whereby the latter will be kept in a sanitary condition.

A further object of the invention is to provide a cheese cutter of the above mentioned character wherein the guide means provided for the vertically reciprocating knife is of such construction as to permit the knife to be readily and easily removed whenever it is necessary to resharpen the knife or to clean the same.

A still further object is to provide a cheese cutter of the above mentioned character which is simple in construction, inexpensive, and furthermore adapted to the purposes for which the same is designated.

Other objects and advantages of this invention will become apparent during the course of the following description.

In the accompanying drawing forming part of this specification and in which like numerals are employed to designate like parts throughout the same:

Figure 1 is a longitudinal sectional view of the cheese cutter embodying my invention.

Fig. 2 is a vertical sectional view taken approximately on line 2—2 of Fig. 1 looking in the direction of the arrows.

Fig. 3 is a sectional view taken approximately on line 3—3 of Fig. 2 looking in the direction of the arrows, Fig. 4 is a transverse section through the standard showing the guides for the vertically reciprocating knife, and Fig. 5 is a detail elevational view of the support for the feed screw.

In the drawing wherein for the purpose of illustration is shown the preferred embodiment of my invention, the numeral 1 designates the base, and secured thereon is the substantially rectangular shaped casing 2 the same being formed of any suitable material and having its respective ends open. The sides of the casing have their lower edges bent laterally as illustrated at 3 more clearly in Fig. 2 of the drawing whereby the casing may be secured on the base. The blocks of cheese which are now put up into individual packages or boxes are of substantially rectangular design and therefore the casing 2 is of such shape so as to accommodate a block of cheese after the same has been removed from its container and is placed in the casing. The casing will cover the block of cheese and thus keep the same in a sanitary condition.

Extending upwardly from the base at the sides of the forward end of the casing 2 are the standards 4 and 5 respectively. A pair of angle iron guide members 6 and 7 respectively are secured on the inner side of each of the standards, the same extending for the full length of the standards as clearly illustrated in Fig. 2. The spaced angle iron guide members which are associated with the standards provide a means for receiving and guiding the knife 8 of the vertically reciprocating cutter, the respective ends of a knife or blade 8 being disposed between the angle iron guides 6 and 7 of the respective standards as shown in Fig. 2.

A substantially inverted U-shaped carrier 9 has the free ends of the arms thereof secured to the blades and a suitable handle 10 is supported on the crown portion of the inverted U-shaped member 9, the same projecting above the standard for a suitable distance, whereby the handle may be grasped for actuating the knife when the cutter is in operation.

A top plate 11 extends across the upper ends of the standards and is secured thereon by the fastening screws 12. A longitudinally extending slot or cut out portion 13 is formed in the top plate 11 and the same extends from one end thereof to a point adjacent the other end, the purpose thereof being to provide a means for permitting the arms of the inverted U-shaped member 9 to operate therein when the knife is reciprocated. The open end of the slot or cut out portion 13 is normally closed by the strip 14, the same being removably secured on the top of the standard 5 as at 15 and the purpose of this strip 14 will be presently apparent.

When the strip 14 is removed, the inverted U-shaped carrier 9 may be raised and the knife 8 be disengaged from the guide so as to permit the knife to be removed from between the standards whenever it is necessary to resharpen the blade or for the purpose of cleaning the same. When the strip 14 is in this normal position such as is shown in Fig. 3, there will be no possibility of the knife becoming disengaged from the guides arranged on the inner side of the standard and therefore the vertically reciprocating movement of the knife will at all times be assured.

As is clearly illustrated in the drawing, the knife or blade 8 extends across the forward open end of the casing so that when the block of cheese is fed forwardly so that the forward end thereof projects beyond the forward end of the casing, the knife will come in contact with the outwardly projecting portion of the cheese and cut the same into slices.

For the purpose of feeding the cheese forwardly in the casing gradually as the same is cut up into slices, there is provided in the casing a substantially rectangular shaped follower or plunger 16. This follower is secured on the forward end of the feed screw 17 which is supported longitudinally, a swivel connection being provided for supporting the forward end of the feed screw to the bracket 18 of the follower or plunger 16.

The supporting means for the feed screw comprises the blocks or posts 19 which extends upwardly from the rear end of the base, the same being secured thereto as at 20. The upper end of the post 19 is provided with the laterally extending flange 21 and intermediate portion of the upper end of the post has formed therein the semi-circular threaded portion or notch 22. Cooperating therewith is the semi-circular threaded notch 23 formed in the removable section 24 the latter being adapted to rest on the top of the post 19. The removable section also is provided with the laterally extending flanges 25 which cooperate with the flanges 21 and suitable thumb screws 26 are associated with the cooperating flanges on the post and removable section for detachably securing the section on the post.

The feed screw 17 is disposed in the threaded semi-circular notch 22 of the post 19 and the threaded notch 23 of the removable section 24 also engages the feed screw as is clearly illustrated in Figs. 1 and 3.

The operating means for rotating the feed screw and moving the follower 16 forwardly or rearwardly in the casing 2 comprises a lever 27, the same secured intermediate its ends on the rear end of the feed screw, suitable handles 28 extending laterally from the respective ends of the lever.

The operation of my improved cheese cutter is doubtless obvious from the construction shown and above described and it will be thus seen that a cheese cutter of the above mentioned character will save considerable time and labor in slicing a block of cheese into thin slices. The simplicity in which the present device is constructed enables the same to be manufactured at a very low cost and the several parts may be readily disassembled whenever it becomes necessary.

While I have shown the preferred embodiment of my invention, it is to be understood that various changes in the size, shape and arrangement of parts may be resorted to without departing from the spirit or sacrificing any of the advantages of the appended claim.

Having thus described my invention, what I claim as new is:—

In a cheese cutter comprising a base, a casing secured thereon and open at its respective ends, a pair of vertical standards arranged on the base adjacent the respective sides of the casing adjacent the forward end thereof, a vertically reciprocating knife operable between said standards, guide means therefor, a carrier for the knife, a top plate extending across the upper end of said standards, said plate being slotted longitudinally from one end to a point adjacent the other end thereof to permit the sliding movement of the aforementioned carrier, means for feeding a block of cheese in the casing to said knife; the combination of a removable strip for closing the slotted end of the top plate.

In testimony whereof I affix my signature.

GEORGE DEWEY RITCHIE.